(12) United States Patent
Nee

(10) Patent No.: US 6,764,735 B2
(45) Date of Patent: *Jul. 20, 2004

(54) METAL ALLOYS FOR THE REFLECTIVE OR THE SEMI-REFLECTIVE LAYER OF AN OPTICAL STORAGE MEDIUM

(75) Inventor: Han H. Nee, Irvine, CA (US)

(73) Assignee: Target Technology Company, LLC, Irvine, CA (US)

(*) Notice: Subject to any disclaimer, the term of this patent is extended or adjusted under 35 U.S.C. 154(b) by 45 days.

This patent is subject to a terminal disclaimer.

(21) Appl. No.: 10/090,855

(22) Filed: Mar. 4, 2002

(65) Prior Publication Data

US 2002/0122913 A1 Sep. 5, 2002

Related U.S. Application Data

(63) Continuation-in-part of application No. 09/661,062, filed on Sep. 13, 2000, now Pat. No. 6,451,402, which is a continuation-in-part of application No. 09/557,135, filed on Apr. 25, 2000, now abandoned, which is a continuation-in-part of application No. 09/438,864, filed on Nov. 12, 1999, now Pat. No. 6,280,311, which is a continuation-in-part of application No. 09/102,163, filed on Jun. 22, 1998, now Pat. No. 6,007,889.

(51) Int. Cl.$^7$ ................................................. B32B 3/02
(52) U.S. Cl. ..................... 428/64.1; 428/64.2; 428/457; 430/270.12
(58) Field of Search ............................... 428/64.1, 64.4, 428/457, 913; 430/270.12, 495.1, 945; 369/283, 288

(56) References Cited

U.S. PATENT DOCUMENTS

| 4,404,656 A | 9/1983 | Cornet |
| 4,405,994 A | 9/1983 | Cornet et al. |
| 4,450,553 A | 5/1984 | Holster et al. |
| 4,709,363 A | 11/1987 | Dirks et al. |
| 4,998,239 A | 3/1991 | Strandjord et al. |
| 5,090,009 A | 2/1992 | Hamada et al. |
| 5,093,174 A | 3/1992 | Suzuki et al. |
| 5,171,392 A | 12/1992 | Iida et al. |
| 5,325,351 A | 6/1994 | Uchiyama et al. |
| 5,391,462 A | 2/1995 | Arioka et al. |
| 5,415,914 A | 5/1995 | Arioka et al. |
| 5,419,939 A | 5/1995 | Arioka et al. |
| 5,498,507 A | 3/1996 | Handa et al. |
| 5,620,767 A | 4/1997 | Harigaya et al. |
| 5,640,382 A | 6/1997 | Florczak et al. |
| 5,753,413 A | 5/1998 | Nishida et al. |

(List continued on next page.)

FOREIGN PATENT DOCUMENTS

| CA | 2401389 | 7/2002 |
| EP | 0 720 159 A2 | 7/1996 |
| EP | 0 737 966 A1 | 10/1996 |
| EP | 0 745 985 A2 | 12/1996 |
| EP | 0 798 401 A2 | 10/1997 |
| EP | 0 867 868 A2 | 9/1998 |

(List continued on next page.)

OTHER PUBLICATIONS

English Translation of PCT Publication No. WO 00/21079.
English Translation of EP Publication No. 0 594 516 B1.
English Translation of JP Publication No. 02–192046.
English Translation of JP Publication No. 10–011799.
English Translation of JP Publication No. 09–212915.
English Translation of JP Publication No. 07–105575.

Primary Examiner—Elizabeth Mulvaney
(74) Attorney, Agent, or Firm—Woodard, Emhardt, Moriarty, McNett & Henry LLP

(57) ABSTRACT

A silver-based alloy thin film is provided for the highly reflective or semi-reflective layer of optical discs. Alloy additions to silver include gold, palladium, copper, rhodium, ruthenium, osmium, iridium, and platinum. These alloys have moderate to high reflectivity and reasonable corrosion resistance in the ambient environment.

16 Claims, 6 Drawing Sheets

U.S. PATENT DOCUMENTS

| | | | |
|---|---|---|---|
| 5,820,994 A | 10/1998 | Gotoh et al. |
| 5,853,872 A | 12/1998 | Shimamori et al. |
| 5,948,497 A | 9/1999 | Hatwar et al. |
| 6,007,887 A | 12/1999 | Hatwar et al. |
| 6,007,889 A | 12/1999 | Nee |
| 6,228,457 B1 | 5/2001 | Ueno et al. |
| 6,280,811 B1 | 8/2001 | Nee |
| 6,451,402 B1 | 9/2002 | Nee |
| 6,544,616 B2 | 4/2003 | Nee |
| 2002/0034603 A1 | 3/2002 | Nee |
| 2002/0122913 A1 | 9/2002 | Nee |
| 2002/0150772 A1 | 10/2002 | Nakai et al. |
| 2003/0003395 A1 | 1/2003 | Yuzurihara et al. |
| 2003/0008236 A1 | 1/2003 | Yamada et al. |
| 2003/0081537 A1 | 5/2003 | Shinotsuka |

FOREIGN PATENT DOCUMENTS

| | | |
|---|---|---|
| EP | 0 917 137 A1 | 5/1999 |
| JP | 403025737 | 2/1991 |
| JP | 03286432 A | 12/1991 |
| JP | 002260270 | 6/1992 |
| JP | 324133/92 | 11/1992 |
| JP | 05012710 | 1/1993 |
| JP | 325406/94 | 5/1993 |
| JP | 05215634 | 9/1994 |
| JP | 05115763 | 11/1994 |
| JP | 06107566 | 1/1995 |
| JP | 07-006427 | 1/1995 |
| JP | 07014221 A | 1/1995 |
| JP | 05195011 | 2/1995 |
| JP | 05179739 | 3/1995 |
| JP | 05215547 | 3/1995 |
| JP | 05233110 | 3/1995 |
| JP | 05249821 | 4/1995 |
| JP | 05251824 | 4/1995 |
| JP | 05277809 | 4/1995 |
| JP | 07105575 A | 4/1995 |
| JP | 05312129 | 6/1995 |
| JP | 06065594 | 10/1995 |
| JP | 07036958 | 10/1995 |
| JP | 06111259 | 12/1995 |
| JP | 06123718 | 12/1995 |
| JP | 07116045 | 12/1995 |
| JP | 06141602 | 1/1996 |
| JP | 06143042 | 1/1996 |
| JP | 06206963 | 3/1996 |
| JP | 06225691 | 3/1996 |
| JP | 06253971 | 5/1996 |
| JP | 07223758 | 5/1996 |
| JP | 07038628 | 9/1996 |
| JP | 07076177 | 10/1996 |
| JP | 273193/96 | 10/1996 |
| JP | 08297858 | 11/1996 |
| JP | 07139459 | 12/1996 |
| JP | 09007226 | 1/1997 |
| JP | 25515/99 | 7/1997 |
| JP | 08014667 | 8/1997 |
| JP | 08019648 | 8/1997 |
| JP | 08035523 | 8/1997 |
| JP | 08050199 | 9/1997 |
| JP | 08115029 | 11/1997 |
| JP | 08149725 | 12/1997 |
| JP | 08158147 | 1/1998 |
| JP | 10-177742 | 6/1998 |
| JP | 411012734 | 1/1999 |
| JP | 2000-228032 | 8/2000 |
| JP | 2000-402146 | 7/2002 |
| WO | WO 97/22968 | 6/1997 |
| WO | WO 00/21079 | 4/2000 |
| WO | WO 02/2054396 | 7/2002 |

METAL ALLOYS FOR THE REFLECTIVE OR THE SEMI-REFLECTIVE LAYER OF AN OPTICAL STORAGE MEDIUM

This is a continuation-in-part of my prior application Ser. No. 09/661,062 filed Sep. 13, 2000 now U.S. Pat. No. 6,451,402 issued Sep. 17, 2002, which is a continuation-in-part of my prior application Ser. No. 09/557,135, filed Apr. 25, 2000 now abandoned, which is a continuation-in-part of my prior application Ser. No. 09/438,864, filed Nov. 12, 1999, which is now U.S. Pat. No. 6,280,311; which is a continuation-in-part of my prior application Ser. No. 09/102,163, filed Jun. 22, 1998, which is now U.S. Pat. No. 6,007,889.

This invention relates to reflective layers or semi-reflective layers used in optical storage media that are made of silver-based alloys or copper-based alloys.

I. BACKGROUND OF THE INVENTION

Four layers are generally present in the construction of a conventional, prerecorded, optical disc. A first layer is usually made from optical grade, polycarbonate resin. This layer is manufactured by well-known techniques that usually begin by injection or compression molding the resin into a disc. The surface of the disc is molded or stamped with extremely small and precisely located pits and lands. These pits and lands have a predetermined size and, as explained below, are ultimately the vehicles for storing information on the disc.

After stamping, an optically reflective layer is placed over the information pits and lands. The reflective layer is usually made of aluminum or an aluminum alloy and is typically between about 40 to about 100 nanometers (nm) thick. The reflective layer is usually deposited by one of many well-known vapor deposition techniques such as sputtering or thermal evaporation. *Kirk-Othmer, Encyclopedia of Chemical Technology*, 3$^{rd}$ ed. Vol. 10, pp. 247 to 283, offers a detailed explanation of these and other deposition techniques such as glow discharge, ion plating, and chemical vapor deposition, and this specification hereby incorporates that disclosure by reference.

Next, a solvent-based or a UV (ultraviolet) curing-type resin is applied over the reflective layer, which is usually followed by a label. The third layer protects the reflective layer from handling and the ambient environment. And the label identifies the particular information that is stored on the disc, and sometimes, may include artwork.

The information pits residing between the polycarbonate resin and the reflective layer usually take the form a continuous spiral. The spiral typically begins at an inside radius and ends at an outside radius. The distance between any 2 spirals is called the "track pitch" and is usually about 1.6 microns. The length of one pit or land in the direction of the track is from about 0.9 to about 3.3 microns. All of these details are commonly known for compact audio discs and reside in a series of specifications that were first proposed by Philips NV of Holland and Sony of Japan as standards for the industry.

The disc is read by pointing a laser beam through the optical grade polycarbonate and onto the reflective layer with sufficiently small resolution to focus on the information pits. The pits have a depth of about ¼ of the wavelength of the laser light, and the light generally has a wavelength in the range of about 780 to 820 nanometers, although wavelengths as short as 400 nanometers are also used. Destructive (dark) or constructive (bright) interference of the laser light is then produced as the laser travels along the spiral track, focusing on an alternating stream of pits and lands in its path.

This on and off change of light intensity from dark to bright or from bright to dark forms the basis of a digital data stream of 1 and 0's. When there is no light intensity change in a fixed time interval, the digital signal is "0," and when there is light intensity change from either dark to bright or bright to dark, the digital signal is "1." The continuous stream of ones and zeros that results is then electronically decoded and presented in a format that is meaningful to the user such as music or computer programming data.

As a result, it is important to have a highly reflective coating on the disc to reflect the laser light from the disc and onto a detector in order to read the presence of an intensity change. In general, the reflective layer is usually aluminum, copper, silver, or gold, all of which have a high optical reflectivity of more than 80 percent. Aluminum and aluminum alloys are commonly used because they have a comparatively lower cost, adequate corrosion resistance, and are easily placed onto the polycarbonate disc.

Occasionally and usually for cosmetic reasons, a gold or copper based alloy is used to offer the consumer a "gold" colored disc. Although gold naturally offers a rich color and satisfies all the functional requirements of a highly reflective layer, it is comparatively much more expensive than aluminum. Therefore, frequently a copper-based alloy that contains zinc or tin is sometimes used to produce the gold colored layer. But unfortunately, the exchange is not truly satisfactory because the copper alloy's corrosion resistance, in general, is considered worse than aluminum, which results in a disc that has a shorter life span than one with an aluminum reflective layer.

For the convenience of the reader, additional details in the manufacture and operation of an optically readable storage system can be found in U.S. Pat. Nos. 4,998,239 to Strandjord et al. and 4,709,363 to Dirks et al., the disclosures of which are hereby incorporated by reference.

Another type of disc in the compact disc family that has become popular is the recordable compact disc or "CD-R." This disc is similar to the CD described earlier, but it has a few changes. The recordable compact disc begins with a continuous spiral groove instead of a continuous spiral of pits and has a layer of organic dye between the polycarbonate substrate and the reflective layer. The disc is recorded by periodically focusing a laser beam into the grooves as the laser travels along the spiral track. The laser heats the dye to a high temperature, which in turn places pits in the groove that coincide with an input data stream of ones and zeros by periodically deforming and decomposing the dye.

For the convenience of the reader, additional details regarding the operation and construction of these recordable discs can be found in U.S. Pat. Nos. 5,325,351 to Uchiyama et al., and 5,391,462; 5,415,914; and 5,419,939 to Arioka et al., and 5,620,767 to Harigaya et al., the disclosures of which are hereby incorporated into this specification by reference.

The key component of a CD-R disc is the organic dye, which is made from solvent and one or more organic compounds from the cyanine, phthalocyanine or azo family. The disc is normally produced by spin coating the dye onto the disc and sputtering the reflective layer over the dye after the dye is sufficiently dry. But because the dye may contain halogen ions or other chemicals that can corrode the reflective layer, many commonly used reflective layer materials such as aluminum may not be suitable to give the CD-R disc a reasonable life span. So being, frequently gold must be used to manufacture a recordable CD. But while gold satisfies all the functional requirements of CD-R discs, it is a very expensive solution.

Still another type of disc in the optimal disc family that has become popular is a prerecorded optical disc called the digital video disc or "DVD." This disc has two halves. Each half is made of polycarbonate resin that has been injection or compression molded with pit information and then sputter coated with a reflective layer, as described earlier. These two halves are then bonded or glued together with a UV curing resin or a hot melt adhesive to form the whole disc. The disc can then be played from both sides as contrasted from the compact disc or CD where information is usually obtained only from one side. The size of a DVD is about the same as a CD, but the information density is considerably higher. The track pitch is about 0.7 micron and the length of the pits and lands is from approximately 0.3 to 1.4 microns.

One variation of the DVD family of discs is the DVD-dual layer disc. This disc also has two information layers; however, both are played back from one side. In this arrangement, the high reflectivity layer is usually the same as that previously described. But the second layer is only semi-reflective with a reflectivity in the range of approximately 18 to 30 percent. In addition to reflecting light, this second layer must also pass a substantial amount of light so that the laser beam can reach the highly reflective layer underneath and then reflect back through the semi-reflective layer to the signal detector.

In a continued attempt to increase the storage capacity of optical discs, a multi-layer disc can be constructed as indicated in the publication "SPIE Conference Proceeding Vol. 2890, page 2–9, November, 1996" where a tri-layer or a quadri-layer optical disc was revealed, the disclosure of which is specifically incorporated into this specification by reference.

All the data layers were played back from one side of the disc using laser light at 650 nm wavelength. A double-sided tri-layered read-only-disc that included a total of six layers can have a storage capacity of about 26 Giga bytes of information.

More recently, a blue light emitting laser diode with wavelength of 400 nm has been made commercially available. The new laser will enable much denser digital video disc data storage. While current DVD using 650 nm red laser can store 4.7 GB per side. The new blue laser will enable 12 GB per side, enough storage space for about 6 hours of standard-resolution video and sound. With a multi-layer disc, there is enough capacity for a featured movie in the high-definition digital video format.

Currently, the potential choice of the semi-reflective layer is either gold or silicon in the thickness range of 5 to 70 nanometers, as discussed in U.S. Pat. No. 5,171,392 to Iida et al., the disclosure of which is hereby incorporated by reference. Gold, when sufficiently thin, will both reflect and transmit light, has outstanding corrosion resistance, and is relatively easy to sputter into a coating of uniform thickness. But once again, it is also comparatively more expensive than other metals. Silicon is a reasonable alternative to gold, but because it is a semiconductor, its sputtering yield and sputtering rate are significantly lower than gold when applied with the same power. Moreover, silicon also has a tendency to react with oxygen and nitrogen during sputtering, which introduces a whole additional set of problems. For example, usually the application of silicon requires a more complicated sputtering apparatus than one that is normally required to apply other reflective metals. And as a result, neither gold nor silicon offers an ideal semi-reflective layer for use in this type of disc.

For the convenience of the reader, additional details regarding the manufacture and construction of DVD discs can be found in U.S. Pat. No. 5,640,382 to Florczak et al. the disclosure of which is hereby incorporated by reference.

Therefore, what is needed are some new alloys that have the advantages of gold when used as a reflective layer or as a semi-reflective layer in an optical storage medium, but are not as expensive as gold. This invention addresses that need.

II. SUMMARY OF THE INVENTION

In one aspect, this invention is an optical storage medium. The optical storage medium has a substrate with a pattern of features in at least one major surface and a recording layer adjacent the feature pattern. A reflective layer then resides adjacent the recording layer. The optical storage medium may also have a second substrate with a pattern of features in at least one major surface, a second recording layer adjacent the feature pattern, and a second reflective layer adjacent the recording layer. A space layer is then located between the first and second substrates. At least one of the reflective coatings are made of silver and palladium wherein the relationship between the amounts of silver and palladium is defined by $Ag_xPd_t$ where $0.85<x<0.999$ and $0.001<t<0.15$.

In another aspect, this invention is an optical storage medium. The optical storage medium has a substrate with a pattern of features in at least one major surface and a recording layer adjacent the feature pattern. A reflective layer then resides adjacent the recording layer. The optical storage medium may also have a second substrate with a pattern of features in at least one major surface, a second recording layer adjacent the feature pattern, and a second reflective layer adjacent the recording layer. A space layer is then located between the first and second substrates. At least one of the reflective coatings are made of silver and copper wherein the relationship between the amounts of silver and copper is defined by $Ag_xCu_z$ where $0.90<x<0.999$ and $0.001<z<0.10$.

It is an objective of this invention to provide a new metallic alloy for thin film reflective layers that have high reflectivity and similar sputtering characteristics as gold, and is corrosion resistant and yet inexpensive. When a layer of this invention is made thin enough, it can be semi-reflective and transmissive to laser light for the application of DVD-dual layer.

It is another objective of this invention to create a new class of copper containing alloys for thin film reflective layers with moderate to high reflectivity and good corrosion resistance.

It is another objective of this invention to provide a lower cost alternative to the gold reflective layer in a recordable compact disc and still satisfy other functional requirements of the disc such as high reflectivity and corrosion resistance.

It is a further objective of this invention to provide a silver-based or a copper-based alloy for the semi-reflective version of the prerecorded mini-disc (MD) and other current or future generations of optical discs in which reflectivity, corrosion resistance, and ease of application are all important requirements for a low cost and high performance product.

III. BRIEF DESCRIPTION OF THE DRAWINGS

IV. DESCRIPTION OF PREFERRED EMBODIMENTS

Specific language is used in the following description and examples to publicly disclose the invention and to convey its principles to others. No limits on the breadth of the patent rights based simply on using specific language are intended. Also included are any alterations and modifications to the descriptions that should normally occur to one of average skill in this technology.

As used in this specification the term "atomic percent" or "a/o percent" refers to the amount of a particular metal or the amount of a group of particular metals that is present in a particular alloy based upon the number of that metal's atoms that are present, or the number of that group's atoms that are present, whichever the case may be. For example, an alloy that is 15 atomic percent metal "A" and 85 atomic percent metal "B" could also be referenced by a formula for that particular alloy: $A_{0.15}B_{0.85}$.

Figure 1:
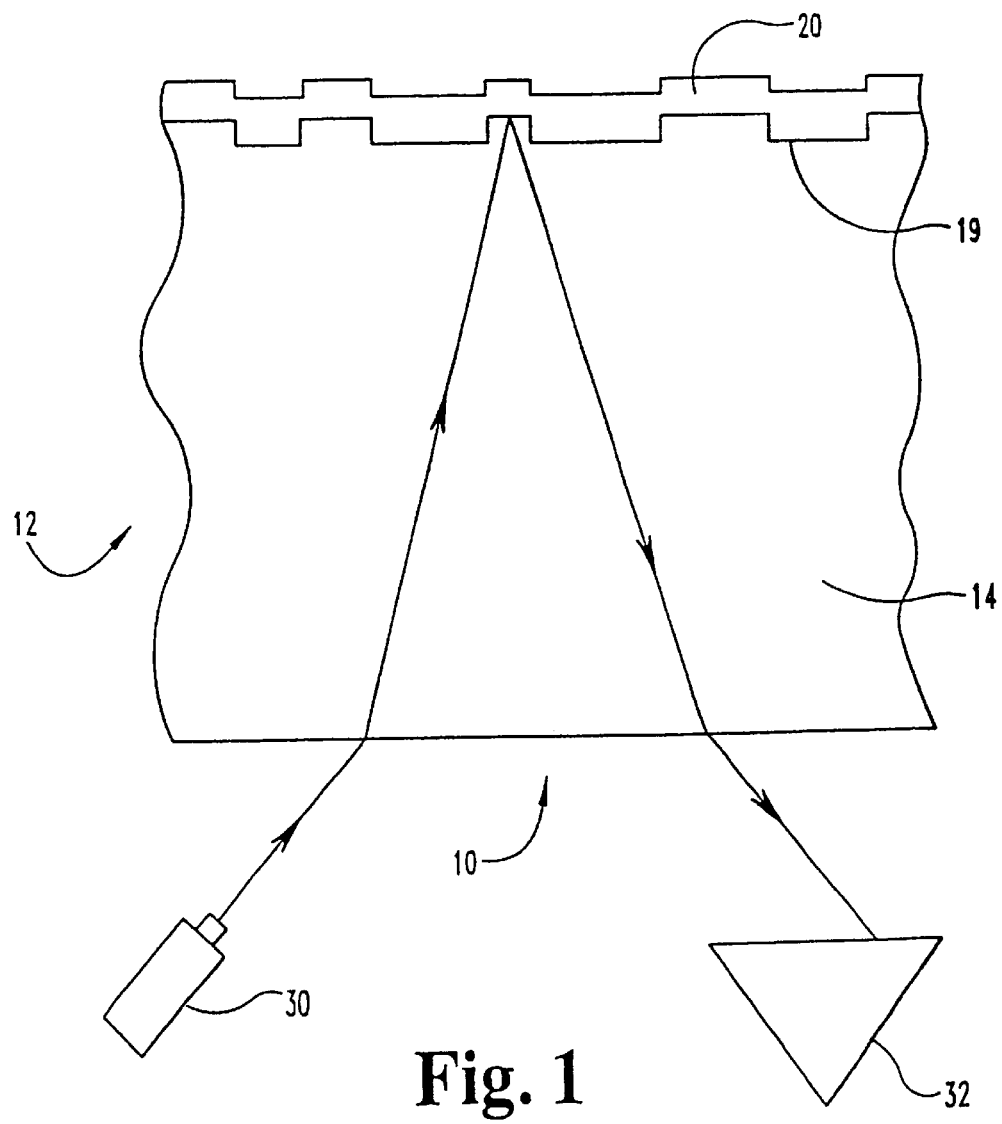
FIG. 1 is an optical storage system according to one embodiment of this invention.

This invention comprises multi-layer metal/substrate compositions that are used as optical data storage media. One embodiment of this invention is shown in FIG. 1 as optical data storage system 10. Optical storage medium 12 comprises a transparent substrate 14, and a highly reflective thin film layer 20 on a first data pit pattern 19. An optical laser 30 emits an optical beam toward medium 12, as shown in FIG. 1. Light from the optical beam that is reflected by thin film layer 20 is sensed by detector 32, which senses modulations in light intensity based on the presence or absence of a pit or land in a particular spot on the thin film layers. The disc is unique in that one of the alloys presented below is deposited upon the information pits and lands and is used as the highly reflective thin film 20. In one alternative (not shown), the disc may be varied by attaching two optical storage media 12 back-to-back, that is, with each transparent substrate 14 facing outward.

Figure 2:
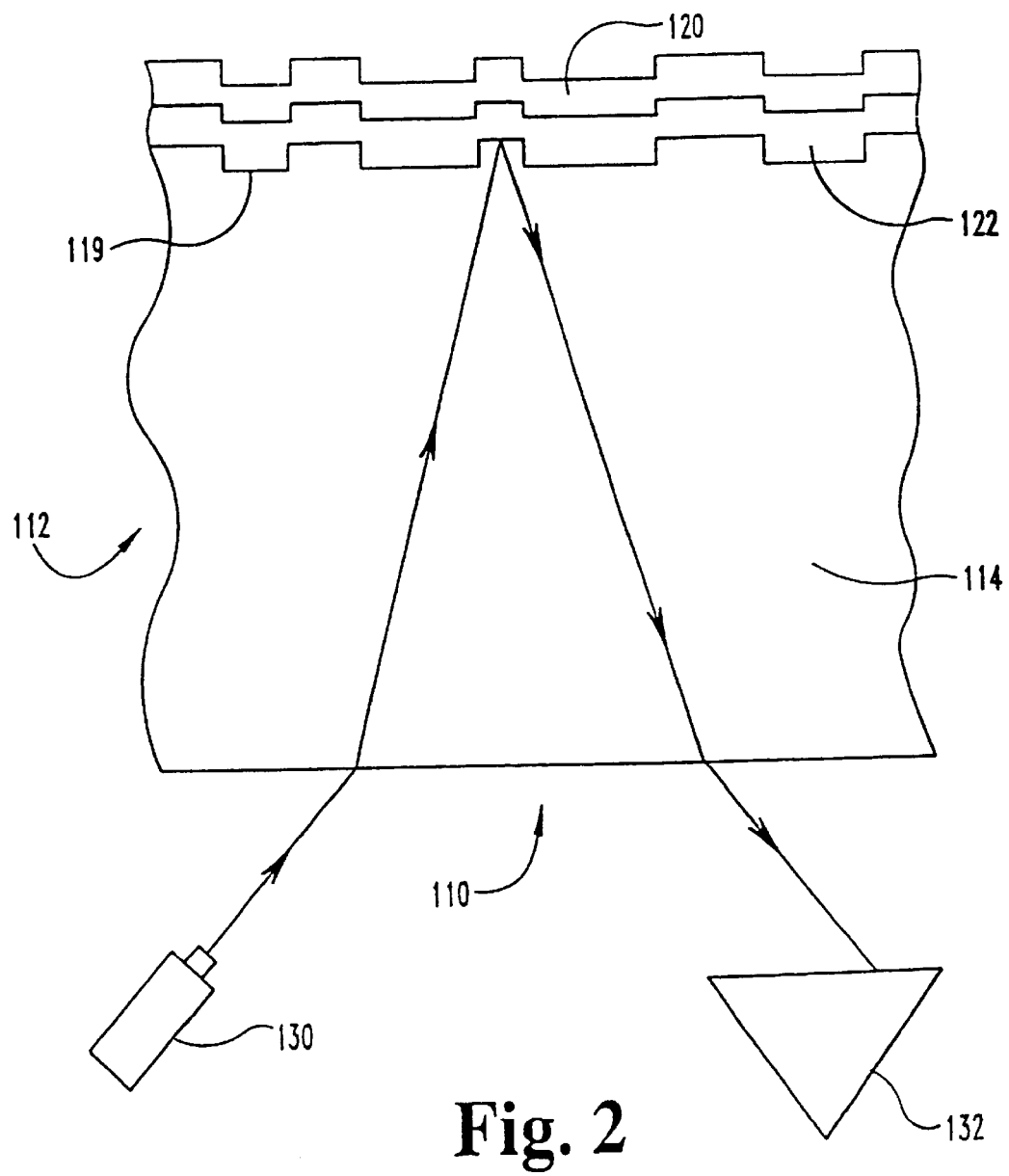
FIG. 2 is an optical storage system according to another embodiment of this invention where an organic dye is used as a recording layer.

Another embodiment of this invention is shown in FIG. 2 as optical data storage system 110. Optical storage medium 112 comprises a transparent substrate 114, and a highly reflective thin film layer 120, over a layer of dye 122, placed over a first pattern 119. An optical laser 130 emits an optical beam toward medium 112, as shown in FIG. 2. As discussed earlier, data is placed upon the disc by deforming portions of the dye layer with a laser. Thereafter, the disc is played by light from the optical beam, which is reflected by thin film layer 120 and sensed by detector 132. Detector 132 senses modulations in light intensity based on the presence or absence of a deformation in the dye layer. The disc is unique in that one of the alloys presented below is deposited over the dye layer 122 and is used as the highly reflective thin film 120. In one alternative (not shown), the disc may be varied by attaching two optical storage media 112 back-to-back, that is, with each transparent substrate 114 facing outward.

Figure 3:
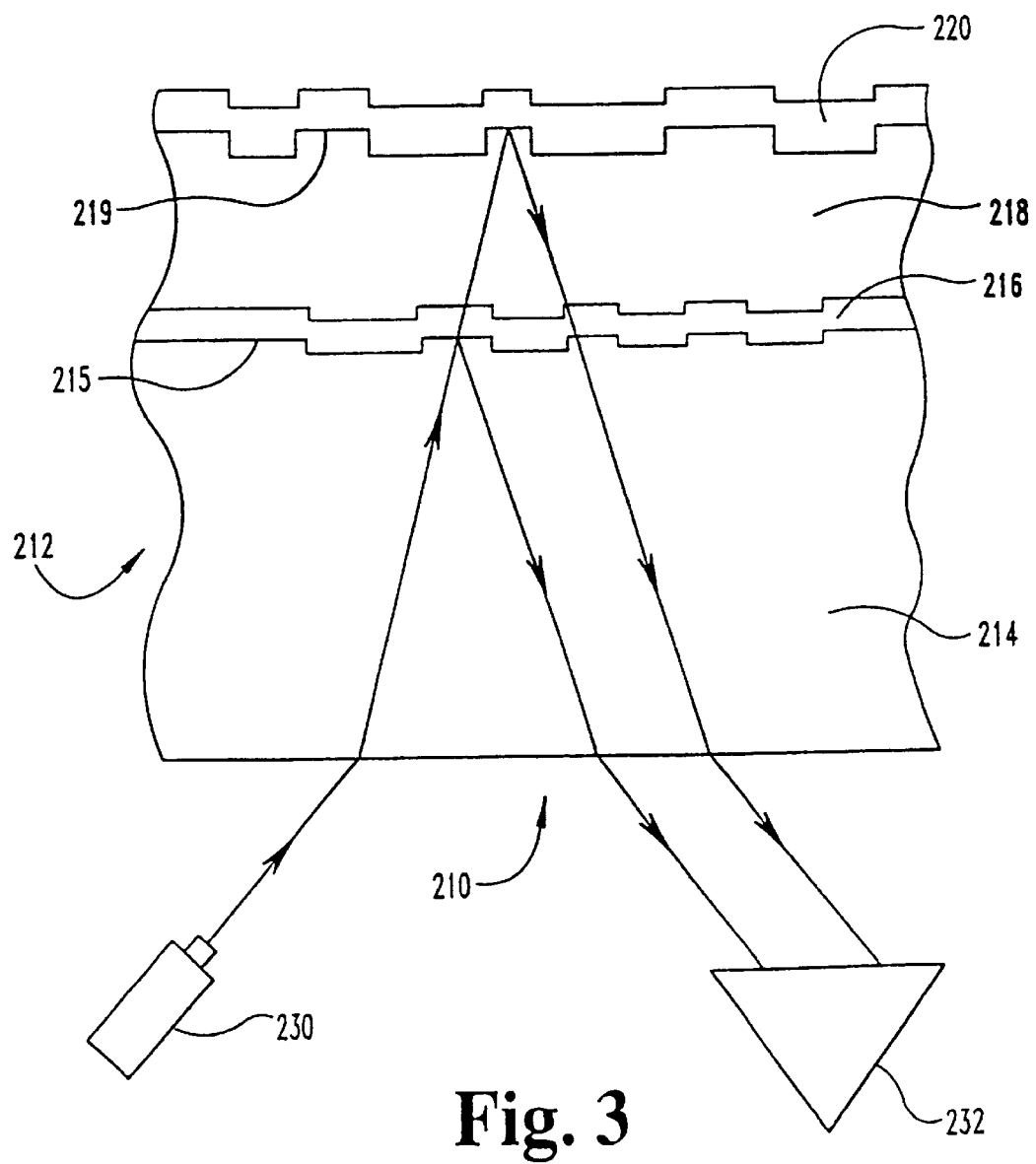
FIG. 3 is an optical storage system according to another embodiment of this invention with two layers of information pits where the playback of both layers is from one side.

Another embodiment of this invention is shown in FIG. 3 as optical data storage system 210. Optical storage medium 212 comprises a transparent substrate 214, a partially reflective thin film layer 216 on a first data pit pattern 215, a transparent spacer layer 218, and a highly reflective thin film layer 220 on a second data pit pattern 219. An optical laser 230 emits an optical beam toward medium 212, as shown in FIG. 3. Light from the optical beam that is reflected by either thin film layer 216 or 220 is sensed by detector 232, which senses modulations in light intensity based on the presence or absence of a pit in a particular spot on the thin film layers. The disc is unique in that one of the alloys presented below is deposited upon the information pits and lands and used as the highly reflective thin film 220 or semi-reflective layer 216.

Figure 4:
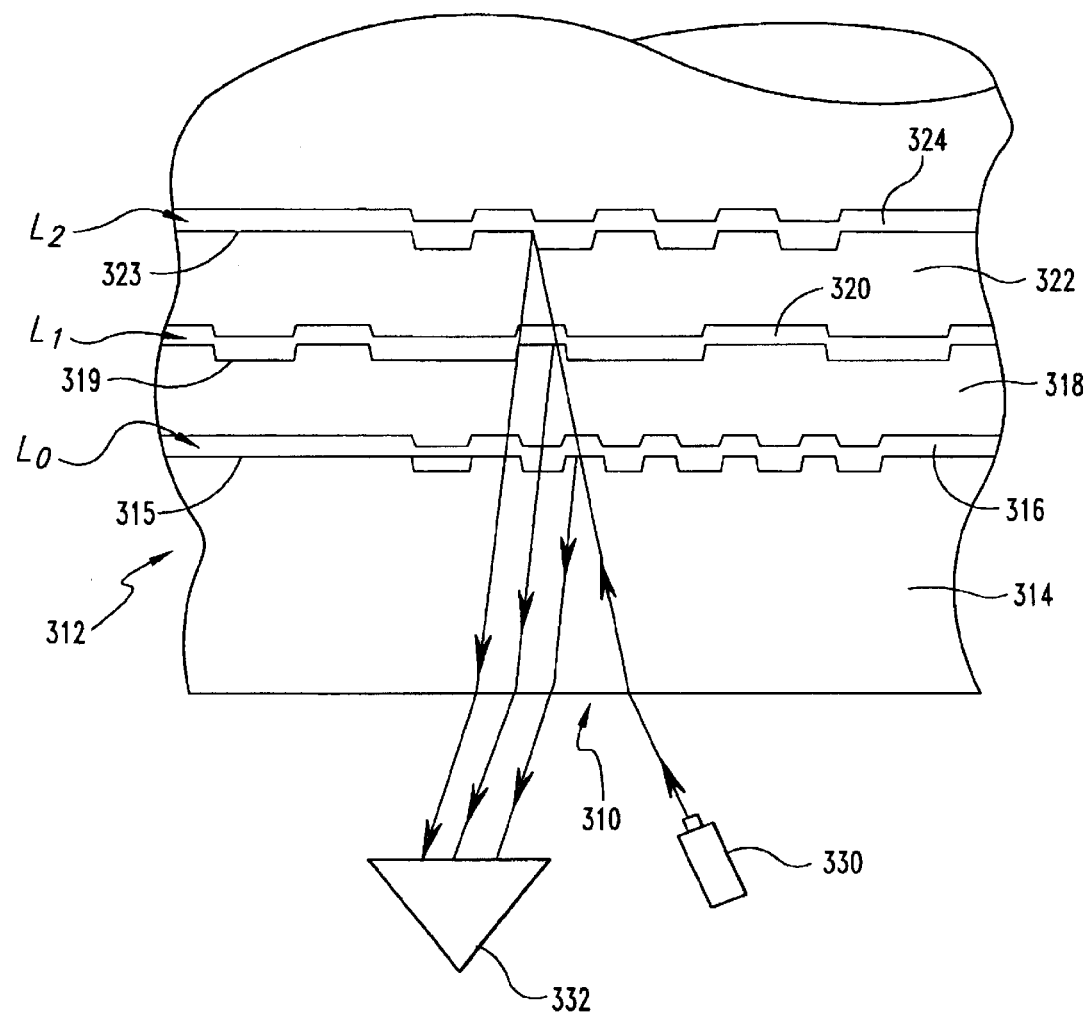
FIG. 4 is an optical storage system according to another embodiment of this invention with three layers of information pits where the playback of all three layers is from one side.

Another embodiment of this invention is shown in FIG. 4 as optical data storage system 310. Optical storage medium 312 comprises a transparent substrate 314, a partially reflective thin film layer 316 or layer "zero" on a first data pit pattern 315, a transparent spacer layer 318, another partially reflective thin film layer 320 or layer "one" on a second data pit pattern 319, a second transparent spacer layer 322, and a highly reflective thin film layer 324 or layer "two" on a third pit pattern 323. An optical laser 330 emits an optical beam toward medium 312, as shown in FIG. 4. Light from the optical beam that is reflected by thin film layer 316, 320 or 324 is detected by detector 332, which senses modulation in light intensity based on the presence or absence of a pit in a particular spot on the thin film layers. The disc is unique in that the same alloy in a number of alloys presented below can be deposited upon the information pits and lands and used as the highly reflective thin film 324 or the semi reflective layer 316 and 320. To playback the information on Layer 2, the light beam from laser diode 330 is going through the transparent polycarbonate substrate, passing through the first semi reflective Layer 0, and the second semi reflective Layer 1 and then reflected back from layer 2 to the detector 332.

As used herein, the term "reflectivity" refers to the fraction of optical power incident upon transparent substrate 14, 114, 214 or 314 which, when focused to a spot on a flat region of layer 20, 120, 216, 220, 316, 320, or 324 could in principle, be sensed by a photodetector in an optical readout device. It is assumed that the readout device includes a laser, an appropriately designed optical path, and a photodetector.

This invention is based on the inventor's discovery that a particular silver-based alloy provides sufficient reflectivity and corrosion resistance to be used as the reflective or the semi-reflective layer in an optical storage medium, without the inherent cost of a gold-based alloy. In one embodiment, the silver is alloyed with a comparatively small amount of gold. In this embodiment, the relationship between the amounts of gold and silver ranges from about 0.1 a/o percent (atomic percent) to about 10 a/o percent gold and from about 90 a/o percent to about 99.9 a/o percent silver. But preferably in respect to each metal, the alloy has from about 5 a/o percent to about 9.5 a/o percent gold and from about 91.5 a/o percent to about 95 a/o percent silver.

In another embodiment, the silver is alloyed with a comparatively small amount of palladium. In this embodiment, the relationship between the amounts of palladium and silver ranges from about 0.1 a/o percent (atomic percent) to about 15 a/o percent palladium and from about 85 a/o percent to about 99.9 a/o percent silver. But preferably in respect to each metal, the alloy has from about 1 a/o percent to about 11 a/o percent palladium and from about 89 a/o percent to about 99 a/o percent silver.

In another embodiment, the silver is alloyed with a comparatively small amount of copper. In this embodiment, the relationship between the amounts of copper and silver ranges from about 0.1 a/o percent (atomic percent) to about 10 a/o percent copper and from about 90 a/o percent to about 99.9 a/o percent silver.

In another embodiment, the silver is alloyed with a comparatively small amount of both copper and platinum. In this embodiment, the relationship between the amounts of platinum, copper and silver ranges from 0.01 a/o percent to 10 a/o percent platinum, 0.1 a/o percent to about 10 a/o percent copper and from about 80 a/o to about 99.89% silver.

In still another embodiment, the silver is alloyed with a comparatively small amount of both gold and palladium. In this embodiment, the relationship between the amounts of gold, palladium and silver ranges from about 0.1 a/o percent to about 10 a/o percent gold, from about 0.1 a/o percent to about 15 a/o percent palladium, and from about 75 a/o percent to about 99.8 a/o percent silver. But preferably in respect to each metal, the alloy has from about 1 a/o percent to about 9.5 a/o percent gold, from about 1 a/o percent to about 10 a/o percent palladium, and from about 80.5 a/o percent to about 94 a/o percent silver.

In still another embodiment, the silver is alloyed with a comparatively small amount of beryllium. In this embodiment, the relationship between the amounts of beryllium and silver ranges from about 0.01 a/o percent to about 10 a/o percent beryllium, and from about 90 a/o percent to about 99.99 a/o percent silver. But preferably in respect to each metal, the alloy has from about 0.1 a/o percent to about 6 a/o percent beryllium, and from about 94 a/o percent to about 99.9 a/o percent silver.

The reflectivity of the above-described binary or ternary alloy systems can be adjusted by changing the concentration of each element. Because this ternary alloy system of silver, gold and palladium is isomorphous, there is no metallurgical difficulty in mixing the metals in any combination of concentrations to keep all the solutes in a single-phase solid solution. A single-phase alloy not only eliminates the chance of ejecting second phase particles during the sputtering process, but also minimizes any potential preferential corrosion sites in the thin film deposited on the optical disc.

The above-described binary or ternary alloy systems can be further modified by adding another element such as copper, which has an intrinsic reflectivity of more than 90 percent, or rhodium, which has an intrinsic reflectivity of about 80 percent. Copper is isomorphous with gold and palladium, but its solubility in silver is somewhat limited. Rhodium is isomorphous with palladium, but has very limited solubility in silver and gold. Therefore, if a single phase solid solution microstructure is desired in the sputtering target, the addition of copper or rhodium to the above silver-based binary or ternary alloy systems is limited to their respective solubility limits, which is about 5 a/o percent or less. However, this 5 a/o percent limit can be exceeded if a fast cooling rate is used both to make the sputtering target and to apply the target as a reflective film. Thus, in total, the preferred concentration of copper or rhodium as an additive to the above-described silver-based, binary or ternary alloy systems can exceed 5 a/o percent and is from about 0.01 a/o percent to about 10.0 a/o percent.

In another embodiment of the present invention, the silver-based, binary and ternary alloy systems are further alloyed with ruthenium, osmium, iridium, platinum, beryllium and copper or mixtures of these metals. If one or a mixture of these metals replaces a portion of the silver in the alloy, the corrosion resistance of the resultant thin film will increase; however, the reflectivity will also drop. In relation to the amount of silver that is present in the above binary or ternary alloy systems, the amount of the above-identified metal that may be preferably added ranges from about 0.01 a/o percent to about 5.0 a/o percent of the silver content.

In still another embodiment of the present invention, the sputtering target is a silver alloy with a comparatively small addition of both palladium and copper as alloying elements. In this embodiment, the relationship between the amounts of silver, palladium and copper ranges from about 0.1 a/o percent to about 15.0 a/o percent palladium, from about 0.01 a/o percent to about 5.0 a/o percent copper and from about 80.0 a/o percent to about 99.9 a/o percent silver. But preferably in respect to each metal, the alloy has from about 0.2 a/o percent to about 5.0 a/o percent palladium, from about 0.1 a/o percent to about 3.0 a/o percent copper, and from about 92.0 a/o percent to about 99.7 a/o percent silver. This silver, palladium and copper ternary alloy can be further alloyed with ruthenium, osmium, iridium, platinum, rhodium and beryllium or mixtures of these metals. In relation to the amount of silver that is present in the above silver, palladium and copper ternary alloy, the amount of the above-identified metal that may be preferably added ranges from 0.01 a/o percent to about 5.0 a/o percent of the silver content.

In a second aspect, this invention is also based on the inventor's discovery that a copper-based alloy provides sufficient reflectivity and corrosion resistance to be used as the reflective layer in an optical storage medium, without the inherent cost of a gold-based alloy.

In one embodiment, the copper is alloyed with a comparatively small amount of silver. In this embodiment, the relationship between the amounts of silver and copper ranges from about 0.01 a/o percent (atomic percent) to about 5 a/o percent silver and from about 95 a/o percent to about 99.99 a/o percent copper.

Figure 7:
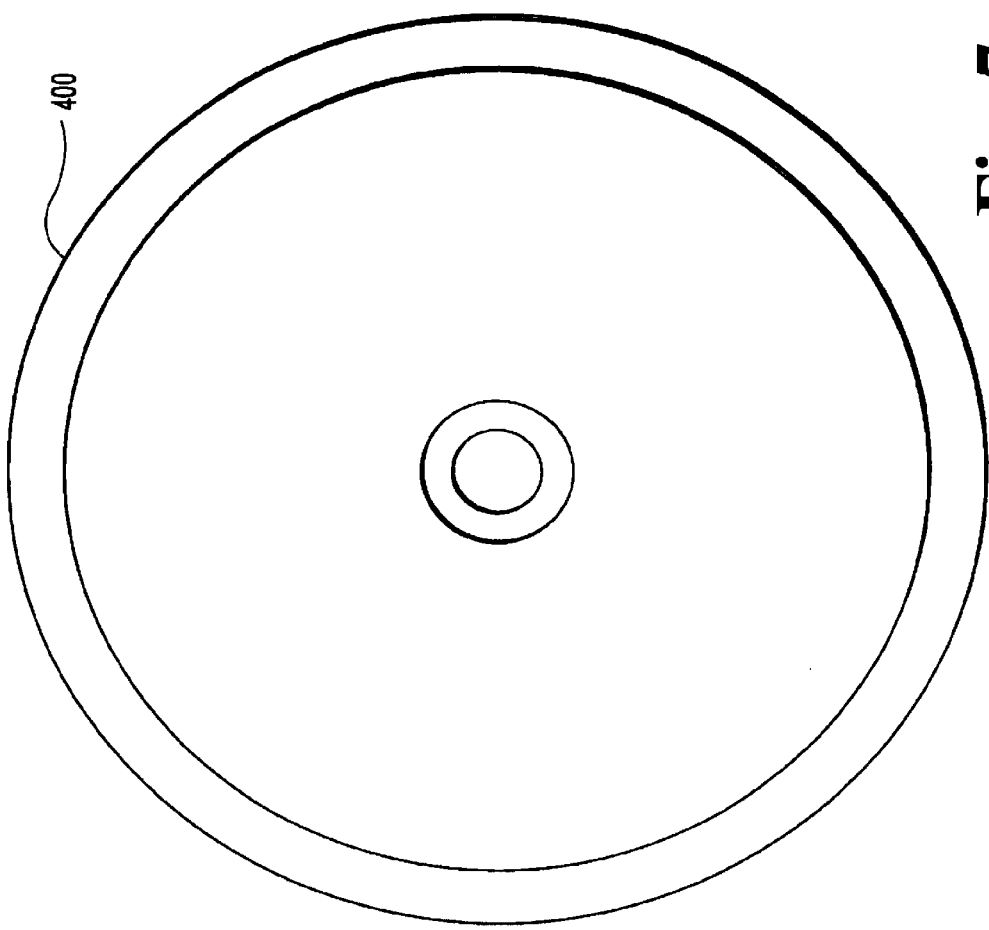
FIGS. 7 and 8 are respectively front and side view of a sputtering target that is used to place the reflective layer on the feature pattern.
Figure 8:
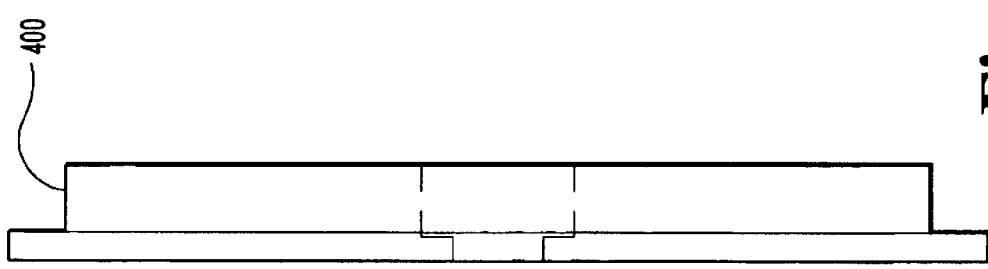

In the fabrication process of the sputtering target (an example of which is item 400 shown in FIGS. 7 and 8), a fast cooling rate is necessary to quench the liquid melt into solids and prevent the silver from precipitating in the copper matrix. And in this regard, it is then preferred that the silver concentration in relation to the copper is kept from about 1.0 a/o percent to about 4.0 a/o percent. This includes all the commercial alloys of the oxygen-free silver-bearing copper with the Unified Number System designation C10400, C10500, C10600, and C10700 with minimum silver content of 0.027, 0.034, 0.054, and 0.085 weight percent, all the commercial silver-bearing tough pitch copper with UNS No. C11300, C11400, C11500, and C11600, and all the commercial alloys of the fire-refined tough pitch silver-bearing copper with UNS No. 12700, C12800, C12900 and C13000.

In a second embodiment, the copper is alloyed with a comparatively small amount of cadmium, which is an oxide former and an oxygen scavenger that will improve the oxidation resistance of copper while having a low impact on reflectivity. In this embodiment, the relationship between the amount of cadmium and copper ranges from about 0.01 a/o percent (atomic percent) to about 15 a/o percent cadmium and from about 85 a/o percent to about 99.99 a/o percent copper.

The solubility limits of cadmium in copper at 500° C. and 300° C. are respectively about 1.40 and 0.50 a/o percent. And at the eutectic temperature of copper and cadmium, the maximum solubility of cadmium in copper is approximately 2.14 a/o percent. Thus, for the same reasons as for the copper-silver alloys, it is again desirable to keep the cadmium in a solid solution of copper for use as a sputtering target (an example of which is item 400 shown in FIGS. 7 and 8). As a result, it is another embodiment of this invention that the cadmium is added to copper preferably in the range of 0.1 a/o percent to 5.0 a/o percent. This range includes the commercial alloys of the so-called anneal-resistant electrolytic copper of UNS C11100 with about 0.01-wt. percent cadmium and about 0.04-wt. percent oxygen. And further includes the commercial alloys of cadmium and copper with UNS numbers C14300 and C14310 with cadmium concentrations in the range of 0.05 wt. percent to 0.15 wt. percent for C14300 and 0.10 to 0.31 wt. percent cadmium for C14310 respectively. And these still further include the commercial cadmium and copper alloys of C16200 with 0.70 wt. percent to 1.20 wt. percent cadmium.

In a third embodiment, the copper is alloyed with a comparatively small amount of gold. Gold is a noble metal, and will increase the corrosion resistance of copper. Gold is isomorphous with copper and can be added in any proportion to copper and still keep the copper-gold alloy a single phase; thus gold's addition to copper as an alloying element is theoretically unlimited and only limited in practice by the ultimate cost of the alloy. In this embodiment, the relationship between the amount of gold and copper ranges from about 0.01 a/o percent (atomic percent) to about 30 a/o percent gold, and from about 70 a/o percent to about 99.99 a/o percent copper. But preferably, in respect to each metal, this alloy has from about 0.1 a/o percent to about 5.0 a/o percent gold and from 95 a/o percent to about 99.9 a/o percent copper.

In a fourth embodiment, the copper is alloyed with a comparatively small amount of magnesium. In this embodiment, the relationship between the amount of magnesium and copper ranges from about 0.01 a/o percent (atomic percent) to about 10 a/o percent magnesium and from about 90 a/o percent to about 99.99 a/o percent copper. But preferably, in respect to each metal, this alloy has from about 0.10 a/o percent to about 5.0 a/o percent magnesium and from about 95 a/o percent to about 99.1 a/o percent copper. Similar to cadmium, magnesium is also a strong oxide former and oxygen scavenger, and is, therefore, capable of reacting with any residual oxygen in copper to form magnesium oxide.

In a fifth embodiment, the copper is alloyed with a comparatively small amount of aluminum. Aluminum will improve the corrosion resistance of copper and slow down the rate of oxide formation. In this embodiment, the relationship between the amount of aluminum and copper ranges from about 0.01 a/o percent (atomic percent) to about 20 a/o percent aluminum and from about 80 a/o percent to about 99.99 a/o percent copper. But preferably, in respect to each metal, this alloy has from about 0.1 a/o percent to about 10 a/o percent aluminum and from 90 a/o percent to 99.1 a/o percent copper. This range includes the commercial alloys C 60800 and C 61000, commonly known as 5 percent and 8 percent aluminum bronze with an aluminum concentration of about 5 percent and 8 percent by weight.

In a sixth embodiment, the copper is alloyed with a comparatively small amount of nickel, which will improve the corrosion resistance of copper. In this embodiment, the relationship between the amounts of nickel and copper ranges from about 0.01 a/o percent (atomic percent) to about 13 a/o percent nickel, and from about 87 a/o percent to about 99.99 a/o percent copper. This includes the commercial alloy C 70600, commonly known as 90-10 cupronickel.

In a seventh embodiment, the copper is alloyed with a comparatively small amount of beryllium, which will improve the corrosion resistance of copper. In this embodiment, the relationship between the amounts of beryllium and copper ranges from about 0.01 a/o percent (atomic percent) to about 10 a/o percent beryllium, and from about 90 a/o percent to about 99.99 a/o percent copper.

In an eighth embodiment, the copper is alloyed with a comparatively small amount of zirconium, which will improve the corrosion resistance of copper. In this embodiment, the relationship between the amounts of zirconium and copper ranges from about 0.01 a/o percent (atomic percent) to about 10 a/o percent zirconium, and from about 90 a/o percent to about 99.99 a/o percent copper.

In addition to all the above-described binary alloys, copper may also be alloyed with two or more of the foregoing metals. For example, nickel may also be included in combination with the above-described copper-aluminum alloy such as the commercial alloy C 61500 with nominal composition limits of aluminum from approximately 7.7 percent to approximately 8.3 percent by weight, and nickel from approximately 1.8 percent to approximately 2.2 percent by weight.

For the convenience of the reader, the following are some combinations of metals, where the metals are identified by their periodic table symbols, which may be preferably alloyed with copper: Ag, Ag+Cd, or Ag+Be, or Ag+Mg, or Cd+Mg, or Al+Ni; or Ag+Cd+Mg, or Ag+Cd+Ni, or Ag+Cd+Al, or Ag+Mg+Ni, or Ag+Mg+Al, or Ag+Ni+Al, or Ag+Mg+Be, or Cd+Mg+Ni, or Cd+Mg+Al, or Be+Ni+Al, or Cd+Ni+Al, or Mg+Ni+Al; or Ag+Cd+Mg+Ni, or Ag+Cd+Mg+Al, or Ag+Cd+Ni+Al, or Ag+Mg+Ni+Al; or Ag+Mg+Ni+Be, or Ag+Be+Al+Ni.

But in general, silver, cadmium, gold, magnesium, aluminum, beryllium, zirconium and/or nickel may be alloyed with copper as a combination of two, three, four, five, six, seven, or all eight metals of from about 0.01 a/o percent up to about 15 a/o (atomic percent) in relation to the amount of copper present. In other words, the total amount of these metals may range from 0.01 a/o percent to about 15 a/o and copper may range from about 85 a/o percent to about 99.99 a/o percent. But preferably, these metals range from about 0.1 a/o percent to about 6 a/o percent and copper ranges from about 94 a/o percent to about 99.9 a/o percent.

An example of a copper alloy system which includes most of the above-mentioned element additions with substantially improved corrosion resistance over pure copper and with high reflectivity and reasonably low cost is of the following composition in atomic percent: silver 0.2 percent, cadmium 0.3 percent, magnesium 1.0 percent, aluminum 1.2 percent, and nickel 0.8 percent with all other impurities less than 0.1 percent, and the balance copper. This alloy will have a reflectivity from approximately 82 percent to 92 percent at 780 nm wavelength-depending on the manufacturing method of the alloy, and its application conditions onto the optical disc or other thin-film devices.

Having presented the preceding compositions for the starting materials, it is important to recognize that both the manufacturing process of the sputtering target (FIG. 7) and the process to deposit the target material into a thin film play important roles in determining the final properties of the film.

To this end, a preferred method of making the sputtering target 400 (shown in FIG. 7) will now be described. In general, vacuum melting and casting of the alloys or melting and casting under protective atmosphere, are preferred to minimize the introduction of other unwanted impurities.

The preferred vacuum melting process is by high frequency induction electric furnace with high strength graphite crucibles. Typically a carefully weighted charge of starting materials sometimes including used sputtering targets was put in the crucible and the vacuum is drawn. After suitable vacuum is reached, the furnace is back filled with an inert gas such as argon, and then the high frequency induction current is turned on to melt the charge. No mechanical stirring of the melt to mix the charge is necessary as the induction current can provide powerful mixing. Mechanical means can be provided in the vacuum furnace to pour and cast the melt into graphite molds of sputtering targets.

Afterwards, the as-cast ingot should undergo a cold working process to break down the segregation and the nonuniform as-cast microstructure. One preferred method is cold forging or cold uniaxial compression with more than 50 percent of size reduction, followed by annealing to recrystallize the deformed material into fine equi-axed grain structure with preferred texture of <1,1,0> orientation. This texture promotes directional sputtering in a sputtering apparatus so that more of the atoms from the sputtering target will be deposited onto the disc substrates for more efficient use of the target material.

Alternatively, a cold multi-directional rolling process of more than 50 percent size reduction can be employed, followed by annealing to promote a random oriented microstructure in the target and finally by machining to the final shape and size suitable for a given sputtering apparatus. This target with random crystal orientation will lead to a more random ejection of atoms from the target during sputtering and a more uniform thickness distribution in the disc substrate.

Depending on different discs' optical and other system requirements, either a cold forging or a cold multi-directional rolling process can be employed in the target manufacturing process to optimize the optical and other performance requirements of the thin film for a given application.

The alloys of this invention can be deposited in the well-known manners described earlier. Those being sputtering, thermal evaporation or physical vapor deposition, and possibly electrolytic or electroless plating processes. Depending on the method of application, the alloy thin film's reflectivity could vary. Any application method that adds impurities to or changes the surface morphology of the thin film layer on the disc could conceivably lower the reflectivity of the layer. But to the first order of approximation, the reflectivity of the thin film layer on the optical disc is primarily determined by the starting material of the sputtering target, evaporation source material, or the purity and composition of the electrolytic and electroless plating chemicals.

Figure 5:
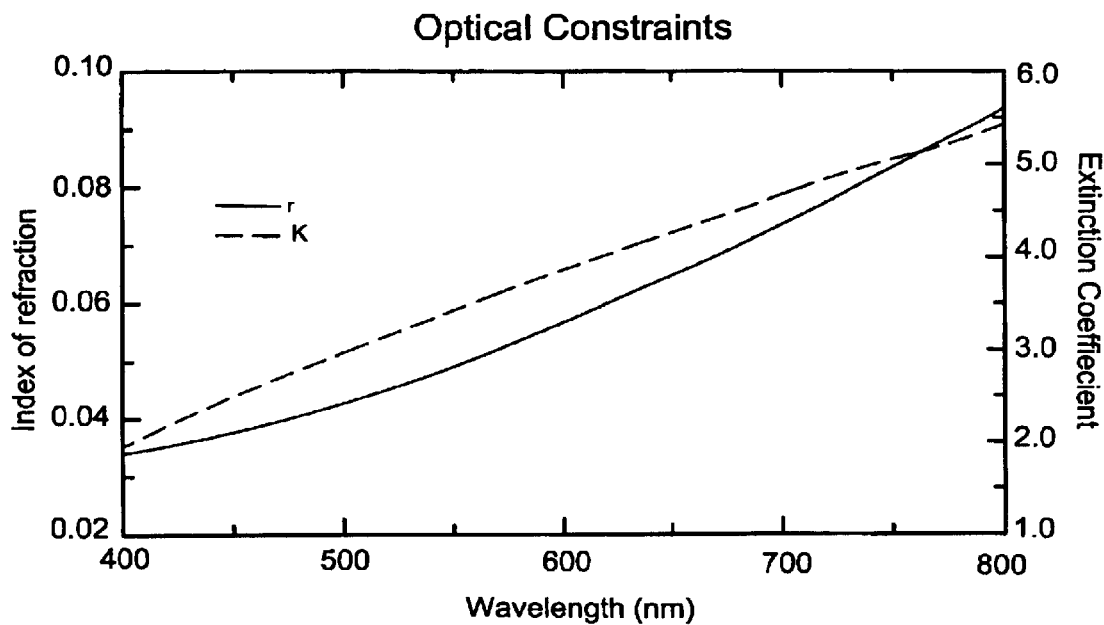
FIG. 5 shows the optical constant of a particular silver alloy of the current invention in the wavelength range of 400 nm to 800 nm.
Figure 6:
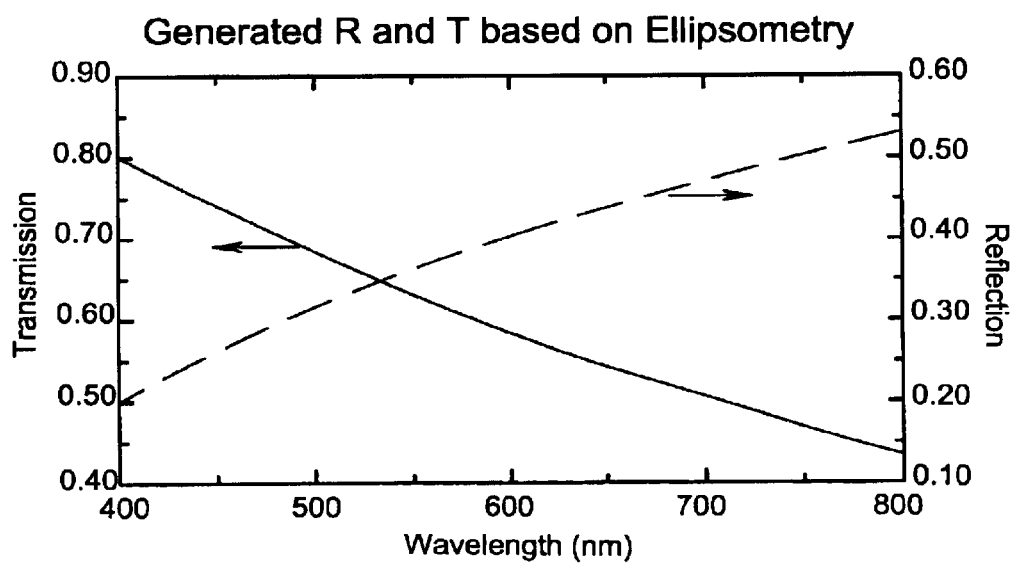
FIG. 6 shows the generated percent reflection and percent transmission of the same silver alloy in FIG. 5 at thickness of about 10 nm in the wavelength range of 400 to 800 nm.

In FIG. 5, the optical constant of a typical silver alloy of this invention from 400 nm to 800 nm wavelength is presented. The solid line is the index of refraction n or the real part and the dotted line is the extinction coefficient k or the imaginary part of the optical constant. The composition of this alloy in atomic percent is Pd: 1.2%, Pt: 0.5%, Cu: 0.3%, Au: 1.0%, with balance Ag. The % reflectivity in dotted line and % transmission in solid line from 400 to 800 nm wavelength of this alloy thin film at 10 nm thickness is presented in FIG. 6. As a stand-alone film, it has reflectivity of about 43% and transmission of about 54% at 650 nm wavelength which is well suited for the semi reflective layer for the dual layer optical disc such as DVD-9 as indicated in FIG. 3. At thickness of 60 to 80 nm, it has reflectivity of approximately 98% at 650 nm wavelength and is well suited for the high reflectivity layer of DVD-9 as indicated in FIG. 3. In a preferred method of applying this silver alloy thin film in the production of DVD-9, both the semi reflective layer and the high reflectivity layer of the same composition can be applied by the same magnetron sputtering machine using a single sputtering target material. Thus compared to the prior art of using two sputtering machines using the gold as semi reflective layer and the aluminum alloy as the high reflectivity layer, one sputtering machine can be eliminated with considerable cost saving. Since the silver alloy has considerable higher reflectivity as the high reflectivity material in a dual layer DVD as compared to the aluminum alloy, the resultant balanced reflectivity for both layers using silver alloy is considerably higher than a gold and aluminum dual layer combination. This enhances the quality of the playback signal. Thus a low cost, high quality dual layer DVD using silver alloy for both layers can be produced. It is understood also that the silver alloy of the present invention can be used as a semi reflective layer only and the high reflectivity layer is a conventional aluminum alloy.

With the recent commercial availability of diode laser based on GaN emitting at 400 nm wavelength, the optical disc's storage capacity can be further increased over the DVD using the shorter wavelength laser. It is further understood that the silver alloy with the optical constants presented in FIG. 5 can be used at 400 nm wavelength in a dual-layer optical disc construction as in FIG. 3 or in a tri-layer optical disc construction as depicted in FIG. 4.

It is further understood that a multi-layer optical disc using the same silver alloy of the present invention for some or all of the semi reflective layers and reflective layer is technically very feasible.

It should be understood that the reflective layer of this invention can be used for future generations of optical discs that use a reading laser of a shorter wavelength, for example, when the reading laser's wavelength is shorter than 650 nanometers.

It should also be understood that, if the reflective film is reduced to a thickness of approximately 5 to 20 nanometers, a semi-reflective film layer can be formed from the alloys of this invention that have sufficient light transmittance for use in DVD dual-layer applications.

V. EXAMPLES

Example 1

An alloy composition of silver with approximately 8 to 10 atomic percent palladium will have a reflectivity of approximately 89 to 91 percent at the wavelength of 800 nanometers and a reflectivity of approximately 83 to 85 percent at the wavelength of 650 nanometers and a reflectivity of approximately 78 to 80 percent at the wavelength of 500 nanometers with the film thickness at about 50 to 100 nanometers.

Example 2

A silver-rich alloy with 9.0 to 9.5 a/o percent of gold will have a reflectivity of approximately 94 to 95 percent at 650 nanometers wavelength. If a reflectivity higher than gold is desired, the gold concentration in silver can be reduced continuously to the pure silver side of the binary phase diagram without incurring any fabrication difficulty of the source material for sputtering or for thermal evaporation.

If the thickness of the thin film is reduced to the 10 to 20 nanometers range, the reflectivity will be reduced to 18 to 30 percent range applicable for DVD-9's semi-reflective layer. Adding a low concentration of an oxide former such as cadmium can further enhance the corrosion resistance of the alloy. As silver has a tendency to dissolve small amount of oxygen in the solid state which tends to lower the reflectivity of the alloy. The added cadmium will react with the oxygen to form cadmium oxide and lessen the degree of oxygen's impact to reflectivity. The desirable range of cadmium is in the approximate range of 0.01 percent to 5.0 atomic percent, with the preferred range from about 0.1 to 1.0 a/o percent.

Example 3

A silver based alloy with about 5 a/o percent of gold and about 5 a/o percent of palladium will have a reflectivity of approximately 86 to 93 percent at the wavelength of about 650 nanometers.

Example 4

A silver based alloy sputtering target with the composition of about 8.9 a/o percent gold, 3.8 a/o percent palladium and balance silver was used to make CD-R discs with the following procedure: On top of a transparent polycarbonate substrate of 1.2 millimeters thickness and 12 centimeters in diameter with pregrooves injection molded from a stamper, a liquid phthalocyanine based recording dye was spin-coated and dried. Subsequently, a highly reflective thin film of silver based alloy approximately 60 nanometers in thickness was deposited on top of the recording dye using a sputtering target of the above mentioned composition in a magnetron sputtering machine. Afterwards, a liquid organic resin was spin-coated on the silver based alloy thin film and cured by ultraviolet light. The reflectivity of the CD-R disc at 780 nanometers wavelength was measured and found to be very similar to discs using pure gold as the high reflectivity layer at similar thickness. The electronic signals and the block error rate of the disc were measured and found to be acceptable and within the CD-R's specification. An accelerated aging test was conducted by subjecting the discs to 80 degrees C. and 85 percent relative humidity for 21 days subsequently. After the aging test, the electronic signals and the block error rate of the discs were measured again and no significant degradation was observed due to the aging test.

Example 5

Another silver based alloy sputtering target with the composition of about 8.7 a/o percent gold, 8.5 a/o percent palladium and balance silver was employed to produce the semi reflective layer of the DVD-9 dual layer disc with the following procedure: On top of a transparent polycarbonate half disc of approximately 0.6 millimeter thickness and 12 centimeters in diameter with information pits injection molded from a suitable stamper, a semi reflective thin film called layer "zero" of silver based alloy approximately 11–12 nanometers in thickness was deposited using the sputtering target of the above mentioned composition in a magnetron sputtering machine. On top of another transparent polycarbonate half disc of approximately 0.6 millimeter thickness with information pits injection molded from another suitable stamper, a high reflectivity thin film called layer "one" of aluminum based alloy approximately 60 nanometers in thickness was deposited using a suitable aluminum alloy sputtering target in another sputtering machine. These two half discs were then spin-coated with suitable liquid organic resins separately, bonded together with layer "zero" and layer "one" facing each other and cured with ultraviolet light. The distance between the layer "zero" and layer "one" was kept at approximately 55+/−5 microns within the disc. The reflectivity of the two information layers was measured from the same side of the disc and found to be about the same at 19 percent for the 650 nanometers wavelength laser light. Electronic signals such as jitter and PI error were measured and found also to be within the published DVD specification. Subsequently, an accelerated aging test at 80 degrees C. and 85 percent relative humidity for 10 days was conducted on these discs. Afterwards, the reflectivity and the electronic signals were measured again and no significant changes were observed as compared to the same measurements before the aging test.

Example 6

A silver based alloy sputtering target with the composition in a/o of approximately 2.4 percent gold, 1.3 percent palladium, 0.2 percent platinum, 0.7 percent copper and the balance silver was employed to produce the semi reflective layer of the DVD-9 dual layer disc. The procedure used to make the discs is the same as in Example 5 above, except the thickness of the semi-reflective layer was approximately 10 nm. The reflectivity of the two information layers in the finished disc was measured from the same side of the disc and found to be about the same at 25.5 percent for the 650 nanometers wavelength laser light. Electronic signals such as jitter and PI error were also measured and found to be within the published DVD specification. Subsequently an accelerated aging test at 80 degrees C. and 85 percent relative humidity for 96 hours was conducted on these discs. Afterwards, the reflectivity and the electronic signals were measured again and no significant changes were observed as compared to the same measurements before aging test.

Example 7

A copper based alloy sputtering target with the composition in a/o of approximately 0.8 percent beryllium, 0.1 percent silver, 0.6 percent magnesium, 1.4 percent zinc and the balance copper was used to produce the high reflectivity layer of the Super Audio Compact Disc (SACD), another type of prerecorded dual layer optical disc with the following procedure: On top of a transparent polycarbonate half disc of about 0.6 mm thickness and 12 cm in diameter with CD type of information pits injection molded from a suitable stamper, a high reflectivity layer of copper based alloy thin film approximately 85 nm thick was deposited using the sputtering target of the above mentioned composition in a magnetron sputtering machine. On top of another transparent polycarbonate half disc of about 0.6 mm in thickness and 12 cm in diameter with Super Audio type of information pits injection molded from another suitable stamper, a semi transparent and semi reflective thin film was deposited by reactive magnetron sputtering. The two halves discs were then bonded together by UV curable resin so that the distance of the conventional CD layer and the high density SACD layer is approximately 0.6 mm. Afterwards, another suitable organic resin was spin-coated on top of the copper alloy thin film and cured with ultraviolet light. In the finished disc, a 650 nm laser beam will playback the high density SACD layer through about 0.6 mm thickness of clear substrate and a 780 nm laser beam will playback the conventional CD layer through about 1.2 mm thickness of clear substrate. The reflectivity of the CD layer with the copper alloy thin film was measured to be approximately 79 percent. Other electronic signals such as jitter and C1 error were also measured and found to be acceptable. Subsequently, an accelerated aging test at 80 degrees C. and 85% RH for 7 days was conducted on these discs. Afterwards, the reflectivity and the electronic signals were measured again and no significant changes were observed as compared to the same measurements before the aging test.

Example 8

A silver based alloy sputtering target with the composition in a/o % of approximately 1.5% beryllium, 0.3% platinum, 0.8% copper and the balance silver was used to produce the reflective layer of a DVD-R disc, another type of recordable disc according to FIG. 2 with the following procedure: On top of a transparent polycarbonate half disc of about 0.6 mm thickness and 12 cm in diameter with pregrooves suitable for DVD-R injection molded from a suitable stamper, a cyanine based recording dye was spin-coated on the substrate, dried, and subsequently a reflective layer of silver based alloy approximately 60 nm in thickness was deposited on the recording dye using the sputtering target of the above mentioned composition in a magnetron sputtering machine. Afterwards, this half disc was bonded to another 0.6 mm thickness half disc by a UV cured resin. Information was recorded onto the disc in a DVD-R recorder and quality of the electronic signal measured. Then the disc was subjected to an accelerated aging test at 80 degrees C. and 85% RH for 96 hours. Afterwards, the electronic signals were measured again and no significant changes were observed as compared to the same measurements before aging test.

Example 9

A silver alloy sputtering target having the composition in a/o %: Pd, 1.2%; Pt, 0.5%, Cu, 0.3%; Au, 1.0% and balance silver was used to produce a dual layer optical information storage medium as depicted in FIG. 3. Thin film about 10 nanometers thickness of this silver alloy was deposited by a magnetron sputtering machine on a suitable polycarbonate substrate. Its optical constants measured and presented in FIG. 5, its calculated reflectivity and transmission presented in FIG. 6 for wavelength from 400 to 800 nanometers. The feasibility of using the same silver alloy thin film for both the reflective layer and the semi reflective layer of a dual layer ultra high density read-only optical disc with a playback laser wavelength at 400 nanometers is investigated. As indicated in FIG. 3, the indices of refraction n of the transparent substrate 214, the semi reflective layer 216, the spacer layer 218 and the high reflectivity layer are 1.605, 0.034, 1.52, 0.034 respectively. The extinction coefficient k for the semi reflective layer and the high reflectivity layer is 2.0. Calculation shows that with a thickness of 22 nm, the semi reflective layer will have a reflectivity $R_0$ of 0.363 and a transmission $T_0$ of 0.615 in the disc at 400 nm wavelength. With a thickness of 55 nm, the high reflectivity layer will have a reflectivity $R_1$ of 0.95. The reflectivity of the high reflectivity layer measured from outside the disc through the semi reflective layer will be $R_0 = R_1 T_0^2$ or 0.36. In other words, to the detector outside the disc, the reflectivity from both the semi reflective layer and the high reflectivity layer will be approximately the same at 0.36. This fulfills one of the important requirements of a dual layered optical information storage medium that the reflectivity from these 2 layers of information should be approximately equal and the relationship between the optical properties of these two layers is $R_0 = R_1 T_0^2$.

Example 10

The same silver alloy in example 9 can also be used as the high reflectivity layer and the two semi reflective layers in a tri-layer optical information storage medium as depicted in FIG. 4. at 400 nm playback laser wavelength. Calculations show that for a thickness of 16 nm for the first semi reflective layer 316, a thickness of 22 nm for the second semi reflective layer 320 and a thickness of 50 nm for the high reflectivity layer 324 in FIG. 4, the reflectivity measured at the detector 332 will be 0.214, 0.214, 0.212 respectively from the three layers. And approximately the same reflectivity from all three layers can be achieved. The reflectivity $R_0$ and the transmission $T_0$ of the first semi-reflective layer are 0.214 and 0.769 respectively. The reflectivity $R_1$ and the transmission $T_1$ of the second semi-reflective layer in the medium are 0.362 and 0.615 respectively. The reflectivity of the third layer $R_2$ or the high reflectivity layer is 0.95. To the external detector 332, the reflectivity from the second semi reflective layer equals $R_1 T_0^2$ or 0.214 and the reflectivity of the third layer equals $R_2 T_0^2 T_1^2$ or 0.212. Thus balance of reflectivity from three information layers using the same silver alloy can be achieved and one sputtering machine and one silver alloy sputtering target can be used to manufacture all three layers of an ultra high density tri-layer optical information storage medium with playback laser wavelength at 400 nm in a production environment. It will be obvious that the aluminum alloys or the copper alloys described in this invention can also be used for the high reflectivity layer of this tri-layer medium.

Example 11

A process to make the sputtering target with the composition as indicated in example 9 will be described hereafter. Initially a master alloy of silver, palladium and platinum is made with suitable initial charge in a vacuum arc melting furnace with tungsten electrode and water cooled copper hearth. Later this master alloy is placed in the crucible of a vacuum induction furnace with suitable charges of silver, copper and gold. The vacuum furnace is pumped down to vacuum pressure of approximately 1 millitorr and then induction heating current turn on to heat the charge. While the charge is heating up and the out gassing is finished, the furnace can be back filled with argon gas to a pressure of about 0.2 to 0.4 atmosphere. Casting of the liquid melt can be accomplished at a temperature approximately 10% above the melting point of the charge. The graphite crucible holding the melt can be equipped with a graphite stopper at the bottom of the crucible. Pouring of the molten metal into individual molds of each sputtering target can be accomplished by opening and closing of the graphite stopper and synchronizing this action with mechanically bringing each mold into position just underneath the melting crucible so that the proper amount of melt can be poured and cast into each target mold by gravity. Afterwards, additional argon flow into the vacuum furnace can be introduced to cool and quench the casting to lower temperature. Subsequently, a cold or warm multi-directional rolling process with more than 50% thickness reduction can be used to break up any nonuniform casting microstructure. Then final anneal is done at 550 to 600 degrees C. in a protective atmosphere for 15 to 30 minutes. After machining the target piece into the right shape and size, cleaning in detergent and properly dried, the finished sputtering target is ready to be put into a magnetron sputtering apparatus to coat optical discs. The approximate sputtering parameters to make the semi reflective layer of an ultra high density optical disc with playback laser wavelength at 400 nanometers as mentioned in example 9 are 1 killowatt of sputtering power, 1 second of sputtering time at an argon partial pressure of 1 to 3 millitorr for a deposition rate of 10 nanometers per second with the target to disc distance of approximately 4 to 6 centimeters. The high reflectivity layer can be made with about the same sputtering parameters as the semi reflective layer except the sputtering power needs to be increased to 4 to 5 killowatts to deposit the high reflectivity layer using the same sputtering target and sputtering apparatus. Thus a 5 inch diameter ultra high density read-only optical disc can be made in this manner with user storage capacity of about 12 to 15 giga bytes per side. A dual layer disc with the construction as shown in FIG. 3. can store approximately 24 to 30 giga bytes of information, enough for a full length motion picture in the high-definition digital television format.

Example 11

A silver based alloy sputtering target with the composition in a/o % of approximately 1.0% palladium, 1.0% copper and the balance silver was used to produce the reflective layer of a DVD-R disc, another type of recordable disc according to FIG. 2 with the following procedure: On top of a transparent polycarbonate half disc of about 0.6 mm thickness and 12 cm in diameter with pregrooves suitable for DVD-R injection molded from a suitable stamper, a cyanine based recording dye was spin-coated on the substrate, dried, and subsequently a reflective layer of silver based alloy approximately 100 nm in thickness was deposited on the recording dye using the sputtering target of the above mentioned composition in a magnetron sputtering machine. Afterwards, this half disc was bonded to another 0.6 mm thickness half disc by an UV cured resin. Information was recorded onto the disc in a DVD-R recorder and quality of the electronic signal measured. Then the disc was subjected to an accelerated aging test at 80 degrees C. and 85% RH for 96 hours. Afterwards, the electronic signals were measured again and no significant changes were observed in the signal as compared to the same measurements before the aging test.

VI. THE CLAIMS

While the invention has been illustrated and described in detail, this is to be considered as illustrative and not restrictive of the patent rights. The reader should understand that only the preferred embodiments have been presented and all changes and modifications that come within the spirit of the invention are included if the following claims or the legal equivalent of these claims describes them.

I claim:

1. An optical information recording medium, comprising:
   a first substrate having a pattern of features in at least one major surface;
   a first recording layer adjacent the feature pattern,
   a first reflective layer adjacent the first recording layer, the reflective layer including a metal alloy, said metal alloy including silver and palladium wherein the relationship between the amount of silver and palladium is defined by $Ag_xPd_t$ where $0.85<x<0.999$ and $0.001<t<0.15$.

2. The medium of claim 1 and wherein $0.001<t<0.05$.

3. The medium of claim 1, and further including:
   a second substrate having a pattern of features in at least one major surface;
   a second recording layer adjacent the feature pattern of said second substrate; and
   a second reflective layer adjacent the second recording layer; and
   a spacer layer, located between said first and second substrate.

4. The medium of claim 1, and further including:
   a second substrate having a pattern of features in at least one major surface;
   a spacer layer, located between said first and second substrate.

5. The medium of claim 1, wherein said metal alloy includes a third metal that is copper, and wherein the relationship between the amount of silver, palladium and copper is defined by $Ag_xPd_tCu_z$ where $0.0001<z<0.10$.

6. The medium of claim 1, and wherein said metal alloy further comprises a metal selected from the group consisting of ruthenium, osmium, iridium, platinum and mixtures thereof, and wherein said metal is present from about 0.01 a/o percent to about 5.0 a/o percent of the amount of silver present.

7. An optical information recording medium, comprising:
   a first substrate having a pattern of features in at least one major surface;
   a first recording layer adjacent the feature pattern; and
   a first reflective layer adjacent the first recording layer, the reflective layer including a metal alloy, said metal alloy including silver and copper wherein the relationship between the amount of silver and copper is defined by $Ag_xCu_z$ where $0.900<x<0.999$ and $0.001<z<0.100$.

8. The medium of claim 7, wherein said metal alloy includes a third metal that is platinum and wherein the relationship between the amount of silver, copper and platinum is defined by $Ag_xCu_zPt_r$ where $0.0001<r<0.099$.

9. The medium of claim 7, and wherein said metal alloy further comprises a metal selected from the group consisting of ruthenium, osmium, iridium, and mixtures thereof, and wherein said metal is present from about 0.01 a/o percent to about 5.0 a/o percent of the amount of silver present.

10. The medium of claim 7, further including:
    a second substrate having a pattern of features in at least one major surface;
    a second recording layer adjacent the feature pattern of said second substrate;
    a second reflective layer adjacent the second recording layer; and
    a spacer layer, located between said first and second substrate.

11. The medium of claim 7, and further including:
    a second substrate having a pattern of features in at least one major surface; and
    a spacer layer, located between said first and second substrate.

12. The medium of claim 7, wherein $0.001<z<0.050$.

13. An optical information recording medium, comprising:
    a first substrate having a pattern of features in at least one major surface;
    a first recording layer adjacent the feature pattern; and
    a first reflective layer adjacent the first recording layer, the reflective layer including a metal alloy, said metal alloy including silver, copper and platinum wherein the relationship between the amount of silver, copper and platinum is defined by $Ag_xCu_zPt_r$ where $0.800<x<0.999$, $0.001<z<0.100$ and $0.0001<r<0.100$.

14. The medium of claim 13, and wherein said metal alloy further comprises a metal selected from the group consisting of ruthenium, osmium, iridium, and mixtures thereof, and wherein said metal is present from about 0.01 a/o percent to about 5.0 a/o percent of the amount of silver present.

15. The medium of claim 13, further including:
  a second substrate having a pattern of features in at least one major surface;
  a second recording layer adjacent the feature pattern of said second substrate;
  a second reflective layer adjacent the second recording layer; and
  a spacer layer, located between said first and second substrate.

16. The medium of claim 13, and further including:
  a second substrate having a pattern of features in at least one major surface; and
  a spacer layer, located between said first and second substrate.

* * * * *